US 6,743,271 B2

(12) United States Patent
Takimoto

(10) Patent No.: US 6,743,271 B2
(45) Date of Patent: Jun. 1, 2004

(54) AIR FILTER FOR GASOLINE AND DIESEL ENGINES

(75) Inventor: Kawaji Takimoto, Atsugi (JP)

(73) Assignee: Yi-Ting Hsu, Taoyuan (TW)

( * ) Notice: Subject to any disclaimer, the term of this patent is extended or adjusted under 35 U.S.C. 154(b) by 30 days.

(21) Appl. No.: 10/216,904

(22) Filed: Aug. 13, 2002

(65) Prior Publication Data

US 2004/0031254 A1 Feb. 19, 2004

(51) Int. Cl.⁷ .......................... B01D 46/10; B01D 53/60
(52) U.S. Cl. .................... 55/385.3; 55/524; 55/527; 95/129; 95/137; 423/239.1
(58) Field of Search ................. 95/59, 61, 129, 95/137; 55/385.3, 524, 527; 423/239.1, 244.02

(56) References Cited

U.S. PATENT DOCUMENTS

| | | | | |
|---|---|---|---|---|
| 4,143,120 A | * | 3/1979 | Sermon ................... | 423/239.1 |
| 5,154,901 A | * | 10/1992 | Yoshida et al. .......... | 423/239.1 |
| 5,290,530 A | * | 3/1994 | Muramatsu et al. ..... | 423/239.1 |
| 5,326,736 A | * | 7/1994 | Hashimoto et al. ....... | 502/326 |
| 5,384,110 A | * | 1/1995 | Muramatsu et al. ..... | 423/239.1 |
| 5,462,693 A | * | 10/1995 | Ichimura et al. .......... | 252/190 |
| 5,645,804 A | * | 7/1997 | Sumiya et al. ........... | 423/239.1 |
| 5,736,482 A | * | 4/1998 | Durand et al. ............. | 502/303 |
| 5,853,684 A | * | 12/1998 | Fang et al. ............... | 423/244.1 |
| 6,093,377 A | * | 7/2000 | Iizuka et al. ............. | 423/213.5 |
| 6,228,799 B1 | * | 5/2001 | Aubert et al. ............... | 502/304 |
| 6,468,484 B1 | * | 10/2002 | Dou et al. ................ | 423/213.2 |
| 2001/0039879 A1 | * | 11/2001 | Chapman ........................ | 96/69 |
| 2003/0072702 A1 | * | 4/2003 | Itoh et al. ................ | 423/215.5 |
| 2003/0196420 A1 | * | 10/2003 | Chen ........................... | 55/497 |

\* cited by examiner

Primary Examiner—Robert H. Spitzer
(74) Attorney, Agent, or Firm—Rosenberg, Klein & Lee

(57) ABSTRACT

An air filter for gasoline and diesel engines that drastically improves the burning efficiency of gasoline and diesel engines is provided. The air filter includes a, replaceable filtering member made of natural fibres or synthetic fibres inside an outer box. The natural or synthetic fibres are adhered with naturally radioactive rare earth element minerals that release negative ions. The element minerals are in the form of fine powders with average diameter of 0.1 $\mu$m~100 $\mu$m, such that when air passes through the filtering member, it is purified by the released negative ions and becomes oxygen-rich air for use in the combustion chambers of gasoline or diesel engines.

2 Claims, 2 Drawing Sheets

AIR FILTER FOR GASOLINE AND DIESEL ENGINES

BACKGROUND OF THE INVENTION

1. Field of the Invention

The invention herein relates to a kind of air filter that drastically enhances the burning efficiency of gasoline and diesel engines.

2. Description of the Prior Art

Exhaust discharged from the gasoline and diesel engines, particularly the latter, contains suspension particle material (SPM) as well as nitrogen oxides (NOx), sulphur oxides (SOx) and other harmful substances. To cut down the discharge of those pollutants, studies on finding effective SPM filters or catalysts to treat the exhaust by chemical means are carried on continuously.

The discharge of air pollutants from car engine is a result of incomplete burning in the combustion chamber. In other words, if the fuel mixes with oxygen completely during combustion, there will be fewer pollutants formed in the process.

The inventor has been carrying out studies from the viewpoint that increasing concentration of negative ions in the atmosphere will markedly reduce the emission of NOx and SOx. Thus studies have been focused on how to convert air used by the internal combustion engine into negative ions. In the view of the inventor, by incorporating negative-ion producing rare earth element minerals into the replaceable filtering member of the air filter inside the internal combustion engine, oxygen-rich air may be supplied to enhance the burning efficiency of the internal combustion engine.

SUMMARY OF THE INVENTION

The objective of the invention herein is to provide an air filter used in gasoline and diesel engines, which converts air into negatively charged oxygen rich air for use by the internal combustion engine to greatly enhance fuel burning efficiency and markedly reduce the emission of air pollutants.

Naturally occurring radioactive rare earth element minerals are known to produce negative ions, which have the functions of promoting body metabolism and purifying air. Focusing on the characteristics of these kinds of rare earth element that it actively releases negative ions under natural state, this invention increases the surface area of such rare earth element mineral to maximize its ion formation capacity. To achieve that purpose, rare earth element minerals are made into fine powder with average particle size of 0.1 $\mu$m~100 $\mu$m, and preferably having the size of 0.5 $\mu$m~80 $\mu$m, and incorporated uniformly into natural or synthetic fibres that constitute the filtering member.

The use of this invention in the exhaust emission pathway renders the installation of special filter and catalyst that will adversely affect the output resistance of internal combustion engine unnecessary. Thus it will help enhance the torque at low-speed, improve fuel consumption, address the knocking problem of diesel engines during acceleration and improve the acceleration performance of engine. At the same time, it will greatly reduce the emission of hydrocarbon and carbon monoxide from vehicles of racecar specifications, and allow the switch from high-grade gasoline to regular gasoline, thereby offering great economic benefits.

BRIEF DESCRIPTION OF THE DRAWINGS

The objective, features and effect of the invention herein will become more apparent in the following detailed description of the preferred embodiments, with reference to the accompanying drawings below.

DETAILED DESCRIPTION OF THE PREFERRED EMBODIMENT

Figure 1:
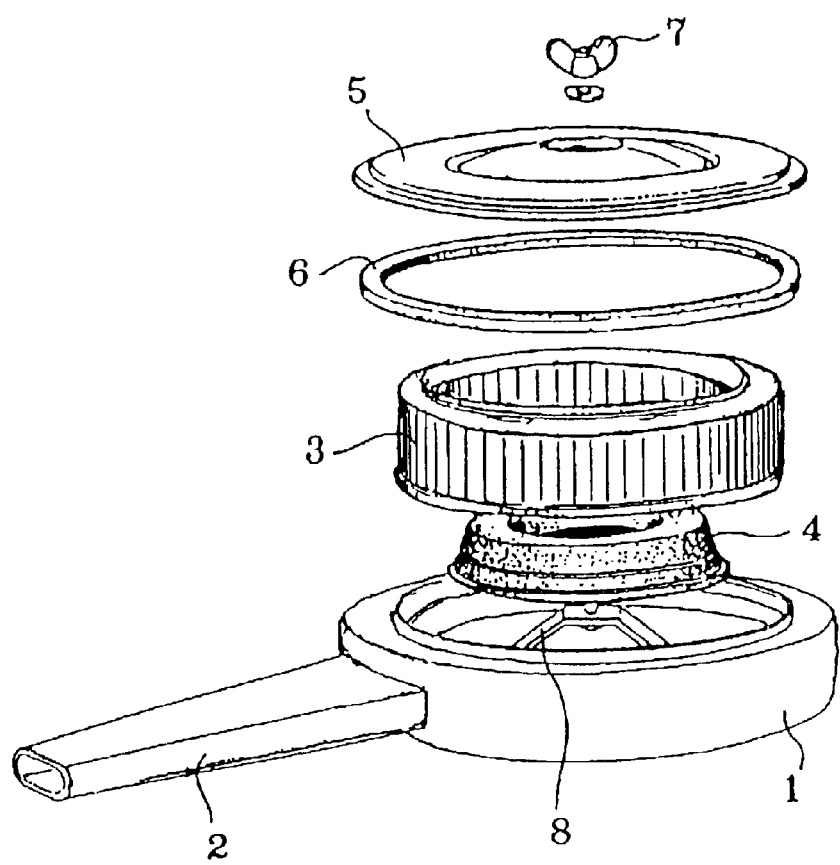
FIG. 1 is a dissectional structural drawing of the preferred embodiment of the invention herein.

The construction of the air filter for gasoline and diesel engines is described as follows:

Referring to FIG. 1, the preferred embodiment of the invention herein comprises an outer box 1 having an air draw-in member 2, a ring-shaped filtering member 3 arranged inside the outer box 1 and having replaceable natural or synthetic fibres, an air silencer 4 arranged internal to the filtering member 3, a cap 5 mounted on top of the outer box 1 through spacer 6, a butterfly nut 7 protrudingly arranged at the center of bracket 8 for securing the cap 5, filtering member 3 and air silencer 4. FIG. 1 illustrates only one example of the air filter. The construction of the air filter in this invention is not significant and may be altered at will.

The filtering member 3 arranged inside outer box 1 is incorporated with fine powder of naturally radioactive rare earth element mineral. The rare earth element mineral refers to any of the seventeen elements including those with atomic numbers of 57–71, namely lanthanum, cerium, praseodymium, neodymium, promethium, samarium, europium, gadolinium, terbium, dysprosium, holmium, erbium, ytterbium, and thulium, plus scandium and yttrium. All these elements produce air-purifying negative ions under natural state.

The aforementioned naturally radioactive rare minerals may be used alone or preferably in mixture. The particle diameter of rare earth minerals suitable for this invention ranges from 0.1 $\mu$m to 100 $\mu$m, and preferably within the range of 0.51 $\mu$m~80 $\mu$m.

This invention sets the average diameter of particles used under 100 $\mu$m, because larger particles adhered to filtering member 3 will affect air circulation due to increasing resistance, and above 0.1 $\mu$m, because smaller particles will pose technical difficulty in production and increase costs.

The fine powder of naturally radioactive rare earth element minerals may be incorporated onto the natural fibres or synthetic fibres that constitute the filtering member 3 by weaving into the fibres or by adhesion without interfering with air passage.

Figure 2:
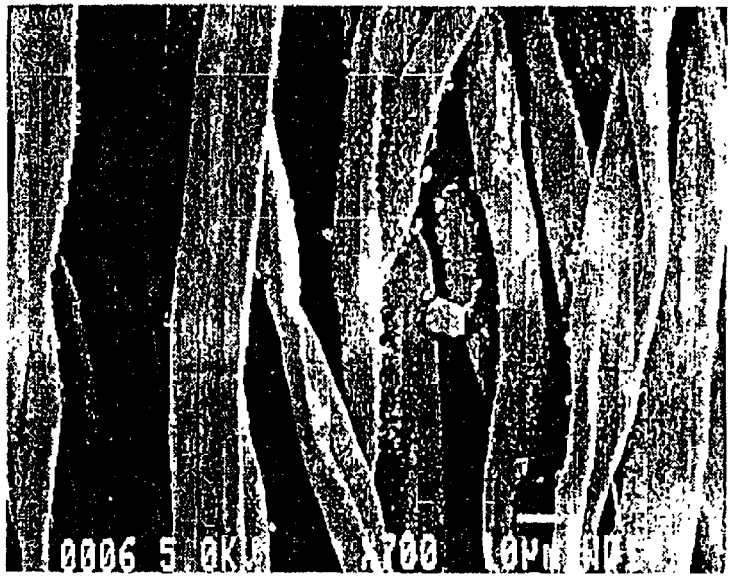
FIG. 2 is a photograph of fibre adhered with fine powder of naturally radioactive rare earth element mineral and used as filtering member under 700x electron microscope.
Figure 3:
FIG. 3 is photograph of fibre adhered with fine powder of naturally radioactive rare earth element mineral and used as filtering member under 3000x electron microscope.

In FIG. 2 & FIG. 3 (EM photos), the thick branching structure is the fibre that constitutes the filtering member, on which fine particles of naturally radioactive rare earth mineral are adhered.

When air is supplied to the internal combustion engine, this invention is able to purify air and makes it oxygen-rich with filtering member containing fine powder of naturally radioactive rare earth mineral that generate negative ions. Through the air draw-in member 2 arranged on outer box 1, air is drawn into the outer box 1. When it passes the ring-shape filtering member 3 inside the outer box, dusts in the air are adsorbed, while physically non-absorbable NOx, SOx and other harmful gases become harmless after they are purified by the negative ions released by the filtering member 3. Subsequently through the hot air tube (not shown in the drawing) that constitutes the air filter, oxygen-rich air is supplied to the internal combustion engine that brings about complete burning in the combustion chambers of the gasoline or diesel engines. Consequently the level of pollutants in the emitted exhaust becomes extremely limited, rendering the additional installation of special-structured filter or catalyst inside the internal combustion engine unnecessary.

The use of this invention allows the supply of oxygen-rich air to the combustion chambers of gasoline or diesel engines, which is conducive to complete combustion and minimizes the discharge of suspension particles. Consequently the torque of the vehicle increases at low speed, and the use of high-grade gasoline may be switched to regular gasoline. In addition, it improves the fuel consumption and addresses the knocking problem of diesel cars during acceleration. Moreover, it greatly improves the emission of hydrocarbon and carbon monoxide from vehicles of racecar specifications.

What is claimed is:

1. An air filter for gasoline and diesel engines, characterized in which air is drawn through an air draw-in member into a box and passes through a filtering member inside said box to have dusts contained in the air removed; fibres arranged inside said box that constitute the filtering member and allow air exchange are incorporated with fine powders of naturally radioactive rare earth element minerals that can release negative ions, and subsequently, air that passes through said filtering member with improved quality is supplied to the combustion chambers of car engine.

2. An air filter for gasoline and diesel engines as claimed in claim 1 in which the fine powders of naturally radioactive rare earth element minerals have average particle diameter of 0.1 $\mu$m~100 $\mu$m.

* * * * *